United States Patent [19]

Heinen

[11] 4,137,202
[45] Jan. 30, 1979

[54] METHOD OF SYNTHESIZING POLYVINYL CHLORIDE COMPOSITIONS

[75] Inventor: Herbert Heinen, Neunkirchen, Germany

[73] Assignee: Dynamit Nobel Aktiengesellschaft, Troisdorf, Bezirk Cologne, Germany

[21] Appl. No.: 537,017

[22] Filed: Dec. 27, 1974

[30] Foreign Application Priority Data

Jan. 8, 1974 [DE] Fed. Rep. of Germany ....... 2400611

[51] Int. Cl.$^2$ .............................................. C08L 91/00
[52] U.S. Cl. ........................... 260/23 XA; 260/29.6 R; 260/42.49; 260/42.55; 260/45.95 R; 260/45.95 E; 260/45.95 H; 260/45.95 L
[58] Field of Search ... 260/23 XA, 33.6 A, 23.7 HM, 260/884, 45.95 L, 45.95 R, 45.95 H, 45.95 E, 42.49, 42.52, 42.53, 878 R

[56] References Cited

U.S. PATENT DOCUMENTS

| | | | |
|---|---|---|---|
| 3,461,960 | 6/1969 | Schmidt | 260/29.6 |
| 3,468,828 | 9/1969 | Perrins et al. | 260/23 XA |
| 3,479,308 | 11/1969 | Gattenby | 260/23 |
| 3,493,537 | 2/1970 | Salyer et al. | 260/23 XA |
| 3,567,669 | 3/1971 | Georgiana | 260/23.7 |
| 3,660,332 | 5/1972 | Kamio et al. | 260/878 R |
| 3,853,970 | 12/1974 | Dietrich | 260/878 R |
| 3,862,066 | 1/1975 | Reiter et al. | 260/45.75 K |
| 3,882,061 | 5/1975 | Bontinck | 260/23.7 H |
| 3,931,076 | 1/1976 | Rubin | 260/23 XA |
| 4,006,201 | 2/1977 | Bauer et al. | 260/878 R |

Primary Examiner—Lewis T. Jacobs
Attorney, Agent, or Firm—Sprung, Felfe, Horn, Lynch & Kramer

[57] ABSTRACT

A process of preparing polyvinyl chloride by the polymerization of monomeric material consisting essentially of vinyl chloride in an aqueous medium containing a suspension vehicle, catalyst for the polymerization, and at least one additive such as stabilizers, lubricants, fillers and pigments. Free-flowing polyvinyl chloride is obtained by dissolving ethylene-vinyl ester copolymer in the vinyl chloride before beginning the polymerization.

14 Claims, No Drawings

METHOD OF SYNTHESIZING POLYVINYL CHLORIDE COMPOSITIONS

BACKGROUND

It is known that, in the preparation of suspension polyvinyl chloride for use in hard PVC compositions, working adjuvants such as stabilizers, fillers, pigments and polymeric impact strength improving agents can be added to the batch prior to polymerization. These are the same additives which are put into pure PVC in conventional methods of fabrication. If all of the additives which are necessary for fabrication can be added to the polymer right in the autoclave, any separate mixing process prior to fabrication can be eliminated.

The size and shape of the PVC composition particles are important to the manufacturer. The product should be free-flowing. Large amounts of particles smaller than 50μ militate against free flow and are therefore undesirable. Furthermore, thread-like and scale-like components must be avoided because in many cases they result in blemishes in extruded products and sheets. If the product to be taken from the autoclave is to be a PVC composition that is ready for fabrication, a number of substances are added to the polymerization mixture according to the future application of the composition. It is obvious that in this method the danger of the formation of undesired particle shapes and sizes is particularly great, since the boundary surface forces of the VC-water system, which is determinative of the later particle shape, are more or less greatly affected by the substances added.

In the case of fines in the polymer, there is also the danger that they may be additive substances which were suspended in the aqueous phase. These fines can separate in pneumatic conveying processes and thus cause inhomogeneities. For this reason, too, a very uniform grain size and composition in the individual grains is of the utmost importance.

The previously known method of polymerizing suspension PVC compositions suffers from decided deficiencies and therefore is little used or is restricted to special, simple products.

THE INVENTION

It has now been found surprisingly that the addition to the polymerization mixture of ethylene-vinyl ester copolymers containing 30 to 60% vinyl esters by weight eliminates the above-described difficulties with regard to grain size and shape. When these copolymers, which are soluble in the vinyl chloride, are used, the particles of the finished compositions are compact, have a uniformly round shape and a narrow grain size range, and are free-flowing.

The subject matter of the invention is a method of preparing free-flowing and blemish-free polyvinyl chloride compositions by the polymerization of vinyl chloride or of monomer mixtures containing vinyl chloride, with the addition of suspension vehicles, monomer-soluble catalysts and working adjuvants and additives, such as stabilizers, lubricants, fillers and pigments, characterized in that ethylene-vinyl ester copolymers are dissolved in the monomers before beginning the polymerization, and the polymerization is performed in the presence of the working adjuvants and additives.

Surprisingly, this results in the formation of compact, uniformly rounded composition granules having a narrow grain size range, so that greatly improved polymer compositions can be produced, having, for the first time, no restrictions on their application.

The polymers that form are compositions which are complete and ready to use, requiring no further mixing process prior to fabrication.

The term, "ethylene-vinyl ester copolymers," as used herein refers especially to copolymers of ethylene and vinyl acetate, but in some cases also copolymers of vinyl propionate.

The ethylene-vinyl ester copolymers are stirred for about 1 to 4 hours in the aqueous suspension mixture, in the presence of the liquid monomeric vinyl chloride. In general, this is done at room temperature, but temperatures as high as 40° C. can be used to hasten dissolution. The additives to be used in the composition, if they do not stop the polymerization, can be added together with the copolymer, but they can be added in whole or in part at a later time, and if desired they can be added repeatedly as polymerization progresses. Since uniform granules are desired, it is preferable to add a larger part of the additives at the beginning of the polymerization; in any case, towards the end of the polymerization—say, after about an 80% transformation has been attained—no substantial amount of additives is put in except those which interfere with polymerization which are therefore added at a late time in the polymerization.

While the mixture is being stirred the vinyl chloride is formed into droplets and the additives dissolve or are dispersed in the vinyl chloride. The ethylene-vinyl ester copolymer likewise dissolves in the VC and influences the VC droplets which are being transformed into granules in the course of the polymerization such that uniform droplets are formed which are then converted to dense, uniformly rond granules.

During the polymerization, vinyl chloride is grafted wholly or partially onto the ethylene-vinyl ester copolymers. The copolymers or graft polymers in the compositions produce an improved impact strength and notch impact strength in much the same manner as the known polymers and graft polymers of ethylene with vinyl esters, and this is desirable and advantageous in the case, for example, of PVC piping, structural shapes and tanks.

Either vinyl chloride alone or monomeric mixtures of 80 to 99% vinyl chloride and 1 to 20% other ethylenically unsaturated compounds, such as vinyl esters such as vinyl acetate and vinyl propionate, vinyl ethers such as vinyl-methyl and -ethyl ethers, acrylic acid esters such as acrylic acid methyl ester, alkenes such as ethylene and propylene or vinylidene compounds such as vinylidene chloride, can be used as monomers. The other monomers can contain 2 to 10, preferably 2 to 4 c-atoms.

The polymerization is generally performed with monomer to water ratios of 1:1 to 1:2.5. The oil-soluble catalysts can be, for example, peroxides such as dilauroyl peroxide or dibenzoyl peroxide, azo compounds such as azo-bisisobutyronitrile or azodimethylvaleronitrile, and peroxydicarbonates such as dicyclohexylperoxydicarbonate or bis-(tert.-butylcyclohexyl)-peroxydicarbonate. Suspension vehicles for the stabilization of the dispersion can include methyl celluloses, hydroxypropylmethyl celluloses, hydroxyethyl celluloses and polyvinyl alcohols.

The temperatures suitable for the above-discussed polymerization systems are between 30 and 80° C., but preferably between 40 and 70° C.

The composition of the ethylene-vinyl ester copolymers is critical insofar as their solubility in the vinyl chloride or monomer mixture containing vinyl chloride must be assured. In the case of the ethylene-vinyl acetate copolymer best solubility of the copolymer is secured by such of contents of vinyl acetate from 30 to 60% by weight. If a greater elastification of the composition is also to be achieved, the most effective copolymers for this purpose are those containing approximately 32 to 50% vinyl acetate by weight. To achieve the effect of grain improvement, copolymers having molecular weights of at least 10,000 to 120,000 are generally usable. If increased elastification is to be achieved, the copolymers most effective for this purpose are those having molecular weights of about 35,000 to 120,000, preferably 45,000 to 110,000. For the achievement of the desired grain improvement, the use of 2 to 8%, preferably 3 to 6%, by weight, of the copolymers is required, based on the vinyl chloride.

Another point in regard to the improvement of grain shape and size which is achieved by this invention is with respect to the amounts of the additives used. The additives used can be lubricants, fillers, pigments, stabilizers and polymeric modifiers.

Lubricants are commonly paraffin waxes, low-molecular polyethylene, long-chain fatty acids (8 to 20 carbon atoms) and their aluminum, calcium, lead and lithium salts. Combinations of two lubricants differing in their internal and external effect, have proven valuable. The total amount can be between 1 and 4%, preferably between 1 and 3%, by weight.

There is no restriction on the kind of fillers which are to be used in the PVC compositions, but calcium carbonate is mainly used, although talc or mica can also be used. The amounts used in the present process should best not exceed 10%; preferably the amount will be between 2% and 5%, by weight.

For pigmentation, commonly used pigments include inorganic pigments such as titanium dioxide in the form of brookite or anatase, and carbon black or ultramarine. The amounts used normally run from 2 to 5% by weight and should not be substantially larger.

A great number of substances are used for stabilizing PVC compositions against elevated temperatures and weather. Examples are barium and/or cadmium salts of long-chain carboxylic acids, epoxidized compounds such as epoxidized fatty acid esters, polyvalent alcohols such as pentaerithritol and trimethylol propane, organic tin compounds, phenolic antioxidants such as bisphenol A, 2,4-dimethylphenol, 2,4-dimethyl-tert.-butylphenol, and hydroquinone, and organic phosphites such as, for example, diphenyl alkyl phosphites having 6 to 18 carbon atoms in the alkyl group or isoalkyl group, such as the i-decyl or i-octyl group among others. The last two groups of stabilizers are known for the fact that they inhibit the polymerization process or bring it to a halt. Consequently, they are not put into the autoclave until towards the end of the reaction. As in the case of the lubricants, a combination of stabilizing substances is also commonly used; the total amount should best not exceed 6% by weight.

Since the use of the ethylene-vinyl acetate in accordance with the invention brings an impact strength improving agent into the hard PVC composition, the addition of other polymeric impact strenth improvers is unnecessary in most cases. Known impact strength improvers which are insoluble in vinyl chloride are chlorinated polyethylene, acrylonitrile-butadiene-styrene copolymers and polymeric acrylates and methacrylates. If they are to be used in addition to the ethylene-vinyl ester copolymers, no difficulty is involved, but the amounts used should preferably not be greater than 4 to 5% by weight.

Remarkably, it is possible, if the above teaching is observed, to bring the polymerization to completion, that is, to achieve transformations of approximately 95 to 98% of the monomers, in spite of the above-mentioned large amounts of so many different additives.

It is to be understood that the additives used in the polymerization and the components of the compositions cannot be restricted to the substances named, because on the one hand the number of the most common of these substances is very great, and on the other hand the process can be performed in the same manner with substances not expressly named herein.

Unless otherwise stated or indicated, the amounts specified herein refer to the monomers (vinyl chloride and the other monomers such as vinyl esters) that are put in.

The compositions thus prepared are usable particularly as hard PVC compositions, although the addition of plasticizers during or after the polymerization is possible.

It is very remarkable that by this process polyvinyl chloride compositions can be prepared having substantially lower contents of monomeric vinyl chloride than in conventional PVC compositions, thereby considerably reducing the hazards involved in their fabrication.

SUMMARY

Thus the invention is an improvement in a process of preparing polyvinyl chloride by the polymerization of monomeric material consisting essentially of vinyl chloride in an aqueous medium containing a suspension vehicle, catalyst for the polymerization, and additives such as stabilizers, lubricants, fillers and pigments. The invention provides the improvement, for obtaining free-flowing polyvinyl chloride, which comprises dissolving ethylene-vinyl ester copolymer in the vinyl chloride before beginning the polymerization. The product can be ready-to-fabricate, i.e. ready for direct conversion into end products such as extrusions, etc.

EXAMPLES

Properties of the products of the following examples are reported in the Table, infra.

EXAMPLE 1

95 parts of water are placed in an enameled autoclave along with 5 parts of a 2 wt-% aqueous solution of methylhydroxypropylcellulose and 0.05 parts of a mixture of 50 parts by weight each of dicyclohexylperoxydicarbonate and dilauroyl peroxide as catalyst. To this is added 3.5 parts of an ethylene-vinyl acetate copolymer containing 45% vinyl acetate (Levapren 450 N of Bayer AG), 1.5 parts of a barium-cadmium stearate, 0.5 parts of epoxidized soybean oil, 1 part paraffin, 0.5 parts $CaCO_3$ and 3 parts $TiO_2$. The autoclave is then closed. It is then evacuated, the vacuum is supplanted with VC gas, and again the autoclave is evacuated. Then 50 parts of vinyl chloride are introduced and the entire mixture is stirred at room temperature for 2.5 hours. During this time the ethylenevinyl acetate copolymer dissolves in the vinyl chloride. The additives are also well distributed in the monomer. The polymerization mixture is then heated to 58° C. and held at this temperature until the end of the reaction. At the beginning the vinyl chloride pressure that establishes itself is 8.4 atmospheres excess pressure.

After a third of the total reaction time the pressure begins to drop. In 7 to 8 hours a polymerization of 95% has been reached and the pressure has dropped to 4 atmospheres excess pressure. At this time, 0.6 parts of an organic phosphite are put in, which stop the already greatly attenuated reaction. About 15 minutes after this last additive has been put in, the autoclave is cooled. The polymer is centrifuged and has a residual moisture content of 16 to 17%; it passes through a stream dryer and emerges therefrom with less than 0.1% moisture. The hard PVC composition thus prepared serves well for the production of extruded shapes.

EXAMPLE 2

Example 1 is repeated except that 2.5 parts of the ethylene-vinyl acetate copolymer containing 45 wt.-% vinyl acetate (Levapren 450 N of Bayer AG) are dissolved in a pressure vessel by stirring for 2.5 hours in vinyl chloride, and this solution is forced into the autoclave which has been filled with water and all of the additives and evacuated, and the contents of the autoclave are then raised to the reaction temperature with stirring. The reaction takes place as in Example 1. When the pressure drops to 4 atmospheres excess pressure, 0.6 parts of the organic phosphite are put in, and 15 minutes later the autoclave is cooled and the composition is extracted. This method shortens the time in which the reaction vessel is occupied for the polymerization of a specific amount of compositions, and therefore it offers economic advantages.

EXAMPLE 3

2.6 parts of an ethylene-vinyl acetate copolymer containing 30 to 33 wt.-% vinyl acetate ("Lupolen KR 1201" made by BASF) are used. The rest of the formulation of Example 1 remains the same. The polymerization and extraction of the composition are identical to those of the preceding examples. When the extruded shapes made from the composition are tested, the impact toughness is different from Example 1 due to the change in the impact toughness improving agent. The effect of the ethylene-vinyl acetate copolymer on the composition granules is clearly apparent, as the Table shows, in the same manner as in Example 1.

EXAMPLE 4

Same as Example 1, but with the addition of 3.5 parts of an ethylene-vinyl acetate copolymer containing 39 to 42 wt.-% vinyl acetate (Elvax 40 of DuPont) and, instead of methylhydroxypropylcellulose as the suspension vehicle, 5 parts of a 2% aqueous solution of methyl cellulose. With this otherwise identical formulation, a composition of good free flow is obtained, having the characteristics given in the Table.

EXAMPLE 5

Same as Example 1, but using 3.5 parts of an ethylenevinyl acetate copolymer containing 50 wt.-% vinyl acetate ("Levapren KA 8114" of Bayer AG) and, as suspension vehicle, 5 parts of a 50:50 mixture of the cellulose derivatives, methyl cellulose and methylhydroxypropylcellulose, in a 2 wt.-% solution. A PVC composition is prepared in a reaction which is otherwise the same. When using ethylenevinyl acetate copolymers containing 50 wt.-% VA and more, care must be taken to see that the slightly sticky products in granular form do not cake up into larger clumps when put into the autoclave, because otherwise there is no assurance of the complete dissolution of the copolymers in the vinyl chloride. Observing these precautions compositions are obtained having the values indicated in the Table.

EXAMPLE 6 (FOR PURPOSES OF COMPARISON)

The formula is the same as the formula of Example 1, except that the 3.5 parts of ethylene-vinyl acetate are omitted. For this reason the 2.5 hours of stirring at room temperature are also omitted. After all of the components have been charged into the autoclave they are heated to the reaction temperature. The reaction time remains the same. When the pressure drops to 4 atmospheres the organic phosphite is put in, the mixture is cooled, and the polymer is extracted.

EXAMPLE 7 (FOR PURPOSES OF COMPARISON)

The ethylene-vinyl acetate copolymer of Example 1 is replaced with a chlorinated polyethylene (27% chlorine by weight) as the impact strength improving component. To make sure that only the ethylene-vinyl acetate copolymer and not the stirring time at room temperature produces the favorable effect on the grain formation, the entire batch is stirred at room temperature for 2.5 hours before heating at the high temperature in this example, as was the batch in Example 1. The reacton otherwise is the same as in the Example 1.

EXAMPLE 8 (FOR PURPOSES OF COMPARISON)

The ethylene-vinyl acetate copolymer of Example 1 is replaced with 3.5 parts of an impact strength improving ABS copolymer (21 wt.-% acrylonitrile, 15 wt.-% butadiene, 64 wt.-% styrene). This copolymer cannot be put into the autoclave except towards the end of the reaction, at which time it is combined with the organic phosphite in the form of a suspension in methanol, because if added at the beginning of the reaction it decidedly retards the polymerization. Again in this experiment, the mixture is stirred for 2.5 hours at room temperature before beginning the polymerization.

During the extraction process in Examples 6 to 8, differences in comparison with Examples 1 to 5 become already apparent. Due to the fine particle content the centrifugal extraction of mixtures 6 to 8 presents difficulties: fine particles fill the filter cloth and lengthen the centrifugation time. In the drying process in the stream dryer, appreciable amounts of the polymer are not separated until they reach the exhaust filter, whereas nearly all of the polymer product of Examples 1 to 5 is removed by a cyclone preceding the exhaust air filter. These findings are manifested by the screening analyses given in the following table.

TABLE

| Example | 1 | 2 | 3 | 4 | 5 | 6 | 7 | 8 |
|---|---|---|---|---|---|---|---|---|
| Impact strength improving component Stirring time at | Levapren 450 N | Levapren 450 N | Lupolen, KR 1201 | Elvax 40 | Levapren KA 8114 | — | Chlorinated polyethylene | ABS Polymers |

TABLE -continued

| Example | 1 | 2 | 3 | 4 | 5 | 6 | 7 | 8 |
|---|---|---|---|---|---|---|---|---|
| room temp. (hr.) | 2.5 | 2.5 | 2.5 | 2.5 | 2.5 | — | 2.5 | 2.5 |
| Particle size in wt. %. | | | | | | | | |
| >250μ* | — | — | 1 | 3 | 3 | 7 | 12 | 5 |
| >200μ | 2 | 10 | 8 | 5 | 3 | 13 | 8 | 18 |
| >150μ | 42 | 38 | 42 | 51 | 47 | 36 | 24 | 21 |
| >100μ | 46 | 42 | 35 | 24 | 31 | 25 | 19 | 27 |
| >63μ | 7 | 9 | 10 | 15 | 10 | 8 | 17 | 13 |
| <63μ | 3 | 1 | 4 | 2 | 6 | 11 | 20 | 16 |
| Pouring time in seconds | 23 | 27 | 32 | 24 | 29 | 58 | will not pour | will not pour |

*μ = microns

The percentage of particles under 63 microns is considerably higher in Example 6 to 8 than it is in Examples 1 to 5 and leads to the phenomena that have been described. The percentage above 250 microns consists in part of scale-like particles and in part of agglomerated particles. This can lead to blemishes and uneven surfaces in extruded, injection molded or calendered products.

The free-flowing quality is tested by the funnel pouring method using 135 g of PVC composition and a funnel nozzle of 8 mm diameter. The advantages of good freeflowing qualities for fabrication, in extruding machines, for example, are known. Generally speaking, a composition of good free-flowing quality will have a particle size predominately between 50 an 250 mμ; the precentage of particles below 50 mμ and above 250 mμ each beeing not greater than 5 wt.-% of the composition.

For purpose of testing free-flow quality the used funnel is made of polished VA-steal the outlet angle of which beeing 40° and the nozzle having a length of 1,5 mm.

What is claimed is:

1. In a process of preparing vinyl chloride polymer by the polymerization of monomeric material consisting essentially of vinyl chloride, in an aqueous medium containing a suspension vehicle, catalyst for the polymerization, and at least one additive, the improvement, for obtaining free-flowing chloride polymer, ready for fabrication, which comprises dissolving ethylene-vinyl ester copolymer in the vinyl chloride before beginning the polymerization.

2. Process of claim 1, wherein the ethylenevinyl ester copolymer is a copolymer of ethylene and at least one of vinyl acetate and vinyl propionate.

3. Process of claim 2, wherein the amount of said copolymer is 2 to 8 wt.% of the vinyl chloride.

4. Process of claim 3, wherein said copolymer is a copolymer of ethylene and vinyl acetate.

5. Process of claim 1, wherein the amount of said copolymer is 2 to 8 wt.% of the vinyl chloride.

6. Process of claim 1, where said monomeric material is at least 80 wt.% vinyl chloride and up to 20 wt.% of other ethylenically unsaturated monomer.

7. Process of claim 1, wherein the ethylenevinyl ester copolymer contains 30 to 60 wt.% of vinyl ester.

8. Process of claim 4, wherein the copolymer of ethylene and vinyl acetate contains 30–60 wt.% of vinyl acetate.

9. Process according to claim 1, wherein the additive is selected from the group consisting of stabilizers, lubricants, fillers and pigments, and based on the amount of monomeric material, the amount of stabilizer is up to 6 wt.%; the amount of lubricant is up to about 4 wt.%; the amount of filler is up to 10 wt.%; and the amount of pigment is up to about 5 wt.%.

10. Process of claim 1, wherein said additive is a stabilizer of the group pentaerithritol, trimethylol propane, bisphenol A, 2,4-dimethyl-phenol, 2,4-dimethyl-tert.-butylphenol, and hydroquinone.

11. Process of claim 1, wherein said additive is a lubricant of the group fatty acids of 8–20 carbon atoms and their aluminum, calcium, lead, and lithium salts.

12. Process of claim 1, wherein said additive is a filler of the group calcium carbonate, talc, and mica.

13. Process of claim 1, wherein said additive is a pigment of the group titanium dioxide, carbon black, and ultra marine.

14. Process of claim 1, wherein said additive is selected from the group consisting of stabilizers, lubricants, fillers, and pigments.

* * * * *

UNITED STATES PATENT AND TRADEMARK OFFICE
CERTIFICATE OF CORRECTION

PATENT NO. : 4,137,202
DATED : January 30, 1979
INVENTOR(S) : Herbert Heinen

It is certified that error appears in the above—identified patent and that said Letters Patent are hereby corrected as shown below:

Col. 5, line 32, change "compositions" to --composition--.

Col. 7, line 44, before "chloride" insert --vinyl--.

Signed and Sealed this

Nineteenth Day of June 1979

[SEAL]

Attest:

RUTH C. MASON
Attesting Officer

DONALD W. BANNER
Commissioner of Patents and Trademarks